US009590941B1

(12) United States Patent
Itoh et al.

(10) Patent No.: US 9,590,941 B1
(45) Date of Patent: Mar. 7, 2017

(54) MESSAGE HANDLING

(71) Applicant: International Business Machines Corporation, Armonk, NY (US)

(72) Inventors: Takaharu Itoh, Yokohama (JP); Tatsuya Sobue, Yokohama (JP); Riko Sato, Suginami-Ku (JP); Hikaru Tamura, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/955,159

(22) Filed: Dec. 1, 2015

(51) Int. Cl.
*H04L 12/58* (2006.01)
*H04L 29/08* (2006.01)
*G06F 17/30* (2006.01)

(52) U.S. Cl.
CPC ........ *H04L 51/24* (2013.01); *G06F 17/30684* (2013.01); *G06F 17/30696* (2013.01); *G06F 17/30705* (2013.01); *H04L 67/306* (2013.01)

(58) Field of Classification Search
CPC ..... H04L 12/58; H04L 12/585; H04L 12/589; H04L 2209/16; H04L 2209/42; H04L 63/0227; H04L 63/102; G06F 21/32
See application file for complete search history.

(56) References Cited

U.S. PATENT DOCUMENTS

| | | | | |
|---|---|---|---|---|
| 5,796,948 A * | 8/1998 | Cohen | ................... | G06Q 10/107 709/202 |
| 6,782,510 B1 * | 8/2004 | Gross | .................... | G06F 17/274 704/10 |
| 6,816,885 B1 * | 11/2004 | Raghunandan | ...... | G06Q 10/107 709/206 |
| 7,058,586 B1 * | 6/2006 | Law | ........................ | G06Q 10/02 705/1.1 |
| 7,089,236 B1 * | 8/2006 | Stibel | ................... | G06F 17/3064 |
| 7,209,942 B1 * | 4/2007 | Hori | .................. | G06F 17/30035 707/999.001 |
| 7,346,539 B1 * | 3/2008 | Atkinson | ........... | G06Q 10/0637 705/7.32 |

(Continued)

FOREIGN PATENT DOCUMENTS

| | | |
|---|---|---|
| JP | 11232304 A | 8/1999 |
| JP | 2009080640 A | 4/2009 |

(Continued)

OTHER PUBLICATIONS

IBM, "A Method to Warn Users of Being Emotional in Email/Chat Before Sending", An IP.com Prior Art Database Technical Disclosure, 2 pages. IP.com No. 000173016. IP.com Electronic Publication: Jul. 24, 2008.

*Primary Examiner* — Backhean Tiv
(74) *Attorney, Agent, or Firm* — Laura E. Gisler

(57) ABSTRACT

A sender of a message may be alerted that the message he is sending contains content that may be culturally sensitive to the recipient of the message. The message specifying a sender and a recipient may be received, and potentially sensitive content within the message may be identified. Biometric data may then be received and a recipient profile with cultural attributes about the recipient of the message can be accessed. The potentially sensitive content can then be analyzed using natural language processing, and sensitive content within the message can be identified. The sender can then be notified that the message contains sensitive content.

9 Claims, 4 Drawing Sheets

(56) References Cited

U.S. PATENT DOCUMENTS

| | | | | |
|---|---|---|---|---|
| 7,818,764 B2* | 10/2010 | Matz | ............... | H04N 7/163 725/34 |
| RE43,379 E * | 5/2012 | Suzuki | ............... | G10H 1/0041 84/600 |
| 8,453,044 B2* | 5/2013 | Markus | ............... | G06F 17/30424 707/769 |
| 8,473,443 B2* | 6/2013 | Lewis | ............... | G06Q 10/107 706/47 |
| 9,241,259 B2* | 1/2016 | Daniela | ............... | H04W 12/02 |
| 9,275,637 B1* | 3/2016 | Salvador | ............... | G10L 15/01 |
| 2002/0178079 A1* | 11/2002 | Russell | ............... | G06Q 10/10 705/26.7 |
| 2007/0055672 A1* | 3/2007 | Stevens | ............... | G06F 17/3087 |
| 2007/0233787 A1* | 10/2007 | Pagan | ............... | G06Q 10/107 709/206 |
| 2007/0282770 A1* | 12/2007 | Choi | ............... | G06N 99/005 706/20 |
| 2008/0109214 A1* | 5/2008 | Shaw | ............... | G06F 17/279 704/9 |
| 2008/0134282 A1* | 6/2008 | Fridman | ............... | G06Q 10/10 726/1 |
| 2009/0222296 A1* | 9/2009 | Wagner | ............... | G06Q 30/02 709/206 |
| 2009/0326953 A1* | 12/2009 | Peralta Gimenez | .... | G10L 15/26 704/270.1 |
| 2010/0082324 A1* | 4/2010 | Itagaki | ............... | G06F 17/2836 704/2 |
| 2010/0268682 A1* | 10/2010 | Lewis | ............... | G06Q 10/107 706/54 |
| 2010/0318620 A1 | 12/2010 | Bansal et al. | | |
| 2011/0078179 A1* | 3/2011 | Unno | ............... | G06F 17/2735 707/769 |
| 2011/0154221 A1* | 6/2011 | DeLuca | ............... | G06Q 10/107 715/752 |
| 2011/0179122 A1* | 7/2011 | Clarizio | ............... | G06Q 10/107 709/206 |
| 2012/0011192 A1* | 1/2012 | Meister | ............... | G06Q 10/107 709/203 |
| 2012/0054284 A1* | 3/2012 | Rakshit | ............... | H04L 51/22 709/206 |
| 2012/0130819 A1* | 5/2012 | Willcock | ............... | G06F 17/30867 705/14.66 |
| 2012/0185486 A1* | 7/2012 | Voigt | ............... | H04L 51/32 707/741 |
| 2013/0060863 A1* | 3/2013 | D'Eri | ............... | G06F 17/274 709/206 |
| 2013/0091217 A1* | 4/2013 | Schneider | ............... | G06Q 50/01 709/204 |
| 2013/0095889 A1* | 4/2013 | Nguyen | ............... | H04W 4/046 455/557 |
| 2014/0101208 A1* | 4/2014 | Hsiao | ............... | G06F 3/04817 707/805 |
| 2014/0136941 A1* | 5/2014 | Avrahami | ............... | G06F 21/6245 715/229 |
| 2014/0207890 A1* | 7/2014 | Rakshit | ............... | G06Q 10/107 709/206 |
| 2014/0222788 A1* | 8/2014 | Noelle | ............... | G09B 5/00 707/722 |
| 2014/0223279 A1* | 8/2014 | Algreatly | ............... | G06T 11/00 715/233 |
| 2014/0229486 A1* | 8/2014 | Kveton | ............... | G06F 17/30731 707/737 |
| 2014/0303964 A1* | 10/2014 | Kennard | ............... | G06F 17/2735 704/10 |
| 2015/0007336 A1* | 1/2015 | Zang | ............... | G06F 21/62 726/26 |
| 2015/0095146 A1* | 4/2015 | Adjaoute | ............... | G06Q 30/0269 705/14.53 |
| 2015/0195378 A1* | 7/2015 | Kano | ............... | G06F 17/30867 709/203 |
| 2016/0012115 A1* | 1/2016 | Vata | ............... | G06F 17/30994 707/730 |
| 2016/0098392 A1* | 4/2016 | Clarke | ............... | G06F 17/2775 713/168 |

FOREIGN PATENT DOCUMENTS

| | | |
|---|---|---|
| JP | 2011040086 A | 2/2011 |
| JP | WO2012070428 A1 | 5/2014 |

* cited by examiner

MESSAGE HANDLING

BACKGROUND

The present disclosure relates to message handling, and more specifically, to handling messages based on sensitive content.

Electronic messaging, including emailing, is a way of exchanging digital messages from an author to one or more recipients. The messages may be exchanged over a network, including, for example, the Internet or another computer network. In some electronic messaging systems, the author and the recipient may both need to be online at the same time, in order for the message to be delivered. In some instances, the messaging may be peer-to-peer messaging, while in others it may be client-server transmission.

SUMMARY

Embodiments of the present disclosure may be directed toward a method that can receive a message that specifies a sender and a recipient. Potentially sensitive content from within the message may be identified. Sender biometric data may be received from a device, where the sender biometric data is data collected about the sender. A recipient profile may then be accessed from a data repository. The recipient profile may comprise cultural attributes about the recipient. A naturally language processing system can analyze the potentially sensitive content based on the sender biometric data, the recipient profile and a sensitive word database. Sensitive content within the potentially sensitive content can then be identified based on the analyzing. The sensitive content can be determined as such based on sensitivity to the recipient. The sender can then be notified that the message contains content sensitive to the recipient.

Embodiments of the present disclosure may be directed toward a system that has a computer readable storage medium with program instructions stored thereon, and one or more processors configured to execute the program instructions to perform a method. The method can include receiving a message that specifies a sender and a recipient. Potentially sensitive content from within the message may be identified. Sender biometric data may be received from a device, where the sender biometric data is data collected about the sender. A recipient profile may then be accessed from a data repository. The recipient profile may comprise cultural attributes about the recipient. A naturally language processing system can analyze the potentially sensitive content based on the sender biometric data, the recipient profile and a sensitive word database. Sensitive content within the potentially sensitive content can then be identified based on the analyzing. The sensitive content can be determined as such based on sensitivity to the recipient. The sender can then be notified that the message contains content sensitive to the recipient.

Embodiments of the present disclosure may be directed toward a computer program product with a computer readable storage medium with program instructions embodied therewith. The computer readable storage medium is not a transitory signal per se. The program instructions are executable by a computer processor to cause the processor to perform a method. The method can include receiving a message that specifies a sender and a recipient. Potentially sensitive content from within the message may be identified. Sender biometric data may be received from a device, where the sender biometric data is data collected about the sender. A recipient profile may then be accessed from a data repository. The recipient profile may comprise cultural attributes about the recipient. A naturally language processing system can analyze the potentially sensitive content based on the sender biometric data, the recipient profile and a sensitive word database. Sensitive content within the potentially sensitive content can then be identified based on the analyzing. The sensitive content can be determined as such based on sensitivity to the recipient. The sender can then be notified that the message contains content sensitive to the recipient.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
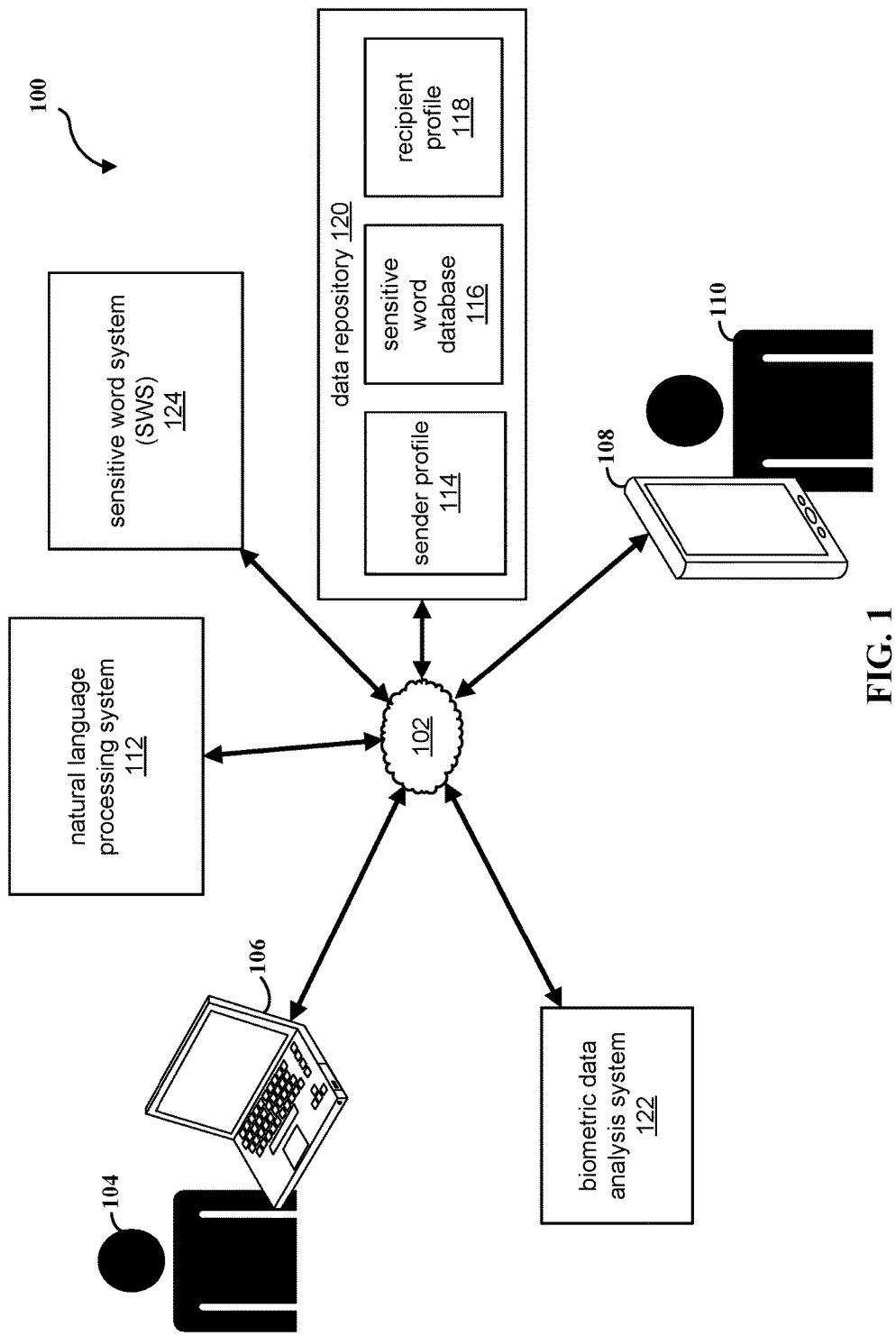
FIG. 1 depicts a system diagram for handling messages to detect sensitive or potentially confusing content, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to message handling, and more particular aspects relate to alerting users to sensitive content within a message. While the present disclosure is not necessarily limited to such applications, various aspects of the disclosure may be appreciated through a discussion of various examples using this context.

Embodiments may be directed toward a computer system that can actively monitor messages to alert senders to potential sensitive content that may exist in the messages. As discussed in detail herein, the system can detect potentially sensitive material in messages based on various data. As used herein, a "sensitive" word may be one that could be considered inappropriate, tactless, unprofessional, have a potential to be misinterpreted negatively, or otherwise cause an adverse negative response in another user. This data can include cultural or other background data about an intended recipient, a database of sensitive words, and biometric data collected from a sender or recipient. A notification of the sensitive nature of the message can be sent to the sender, prior to the delivery of the message, in order to allow the sender to decide whether or not to proceed with the message delivery. In embodiments, further analysis of this data can be used to update the recipient's profile, in order to adjust to personalized preferences and sensitivities. For example, a recipient's biometric response to a message, as determined by collected biometric data including pulse, body temperature, and other data, could be used to determine the accuracy of the prediction of sensitive content for the particular user.

According to embodiments, the computer system can be configured to receive a message that may contain sensitive content, detect the sensitive content, and notify the sender in order to reduce the likelihood that an offensive message is sent. In many instances, the inclusion of sensitive content within a message may be unintentional. This may be particularly relevant in a cross-cultural dynamic, where some words, phrases, or other content may be considered offensive or impolite in one culture but not in another culture.

The system may be configured to receive a message that specifies a sender and a recipient. For example, the system may receive an instant chat message being sent across an instant messaging platform from one user (i.e., the sender) to another user (i.e., the intended recipient). The system may be configured to identify potentially sensitive content from within the message. In embodiments, potentially sensitive content may be identified by the system running a comparison of the message against a list or lists of potentially sensitive words. In embodiments, the identifying of the potentially sensitive content may be conducted by the system sending the message to another system, where the other system is configured to scan the document and flag potentially sensitive words. The identifying of potentially sensitive content may occur in another way as may be obvious to one of ordinary skill in the art. In this way, the computer system, for example sensitive word system (SWS) 124 of FIG. 1, can identify potentially sensitive content for analysis, as described below. If no potentially sensitive content is identified in the message, the message may be delivered to the recipient without further action by the system.

In response to identifying potentially sensitive content, a sensitive word system (SWS), for example SWS 124 of FIG. 1, may receive sender biometric data. For example, biometric data that may be collected about a user include data such as body temperature, pulse, perspiration, pupil dilation, and other physical signs that could indicate a stressful or emotional response. In embodiments, sender and recipient biometric data may be received from a biometric data analysis system, for example biometric data analysis system 122 in FIG. 1, or it may be stored in a database until it is sent to the SWS. In embodiments, the biometric data may be stored temporarily, and may be updated upon collection of new biometric data for the same user. In other embodiments, the data may be stored temporarily for a predetermined period of time or use, or based on another user setting. The identifying may also prompt a real-time receipt of biometric data from the sender, the recipient, or both, based on user-configurable settings as well as the place in the conversation between the sender and recipient the identifying occurred (e.g., an initial communication or a message sent mid-conversation).

In embodiments, the SWS may access a recipient profile from a data repository. The recipient profile may contain data about the user's geography, professional background, and other individualized data that has been submitted by the user or, for example, obtained from hiring data submitted to a company or outside resource. A natural language processing (NLP) system can then analyze the potentially sensitive content of the message, factoring in data from the recipient profile, the sender biometric data, and a sensitive word database. The SWS can factor in other data as well, depending on data availability and user-controlled configurations. Based on the analysis, the SWS can then identify content that is actually sensitive from the potentially sensitive content. If sensitive content is identified within the message, the SWS can notify the sender that the message contains content that could be viewed as sensitive to the recipient. In embodiments, this notification could be an icon sent to the sender's device, a color change or flag across a user interface of the sender's device, a warning tone, or another type of notification. In some cases, the sender may verify that they have received this warning before the message will be sent to the recipient. In some cases, the notification may be tied to a particular time period in which the message will be delayed following the sensitive content notification to the sender.

FIG. 1 depicts a system diagram of a system 100 for handling messages to detect sensitive content, according to embodiments. A sender 104 may enter a message into a client device 106 that is intended to be delivered to a recipient 110, via a recipient's client device 108, e.g., a smartphone, over a network 102. For example, sender 104 may enter a text message via an online application into the client device 106 to be sent to a different geographical region and to be received as a text message by the recipient 110 on the recipient's client device 108. In embodiments, the sender may send a non-text (e.g., audio) message that could then be transferred to text, processed as described herein, and transferred back to audio message when delivered to the recipient 110. For example, in order for the NLP system to process a message that is in a non-textual type format, a translation module which may be a part of the SWS can translate the non-textual type message into text for the NLP to process.

In embodiments, the SWS 124 may receive the message from client device 106. The message may be sent from the device over one or more networks 102. The network or networks 102 can include, but are not limited to, local area networks, point-to-point communications, wide area networks, the global Internet, and combinations thereof. In embodiments, the client device 106 could send the message to the SWS 124 directly. The message may contain data (e.g., metadata) that specifies both the sender and the recipient.

Upon receipt of the message, the SWS 124 can identify from within the message potentially sensitive content. Here, the SWS 124 could compare the message with data from a sensitive word database 116, or in another way known to one in the art. If no potentially sensitive content is identified, the SWS 124 may end its involvement with the message delivery, and the message may be sent to the recipient client device 108.

In embodiments, and as discussed herein, the identifying of the potentially sensitive content may prompt a real-time receipt of biometric data from each of the sender and the recipient. In embodiments, the biometric data may be collected via a client device, for example client device 106 and 108. The client device could possess a touch-sensitive keyboard or other feature which allows it to collect biometric data. In embodiments, the biometric data may be collected from the user directly, for example, from the sender 104 or the recipient 110. For example, the sender 104 could be wearing a fitness device (e.g., a watch or ankle bracelet) that collects biometric data. The fitness device could communicate this data to the client device (e.g., client device 106), or directly over the network 102. The sender 104 could also enter biometric data directly into the client device 106. In embodiments, the data collected by either the client device 106 or sent from the user (e.g., sent via a user-worn or other fitness device) may be sent to the SWS 124, over network 102 or directly, for analysis and use by the NLP system 112. In other embodiments, the biometric data collected as described above may be sent directly or over the network 102 first to a biometric data analysis system 122. The biometric data analysis system 122 may then process the biometric data, in order to send, to the SWS 124, an analysis or analyzed biometric data (depending on the configuration of the biometric data analysis system 122 and the SWS 124), for use in identifying sensitive content.

The SWS 124 may also, in response to the identifying the potentially sensitive content, access a recipient profile 118 from a data repository 120. The data repository 120 may be a part of the SWS 124 or may be communicatively coupled to the SWS 124. The data repository 120, as well as the SWS 124, may be a part of a client device, for example sender device 106, a server or servers, or another device. The data repository 120 may be any destination designated for data storage including semiconductor storage read-write random-access memory (RAM), e.g., dynamic-RAM or DRAM, hard drives, optical disk drives, or other non-volatile disk storage. Data may also be stored flash drives or standalone RAM disks. Data may be partitioned within the data repository 120 based on, for example, security of data.

Figure 2:
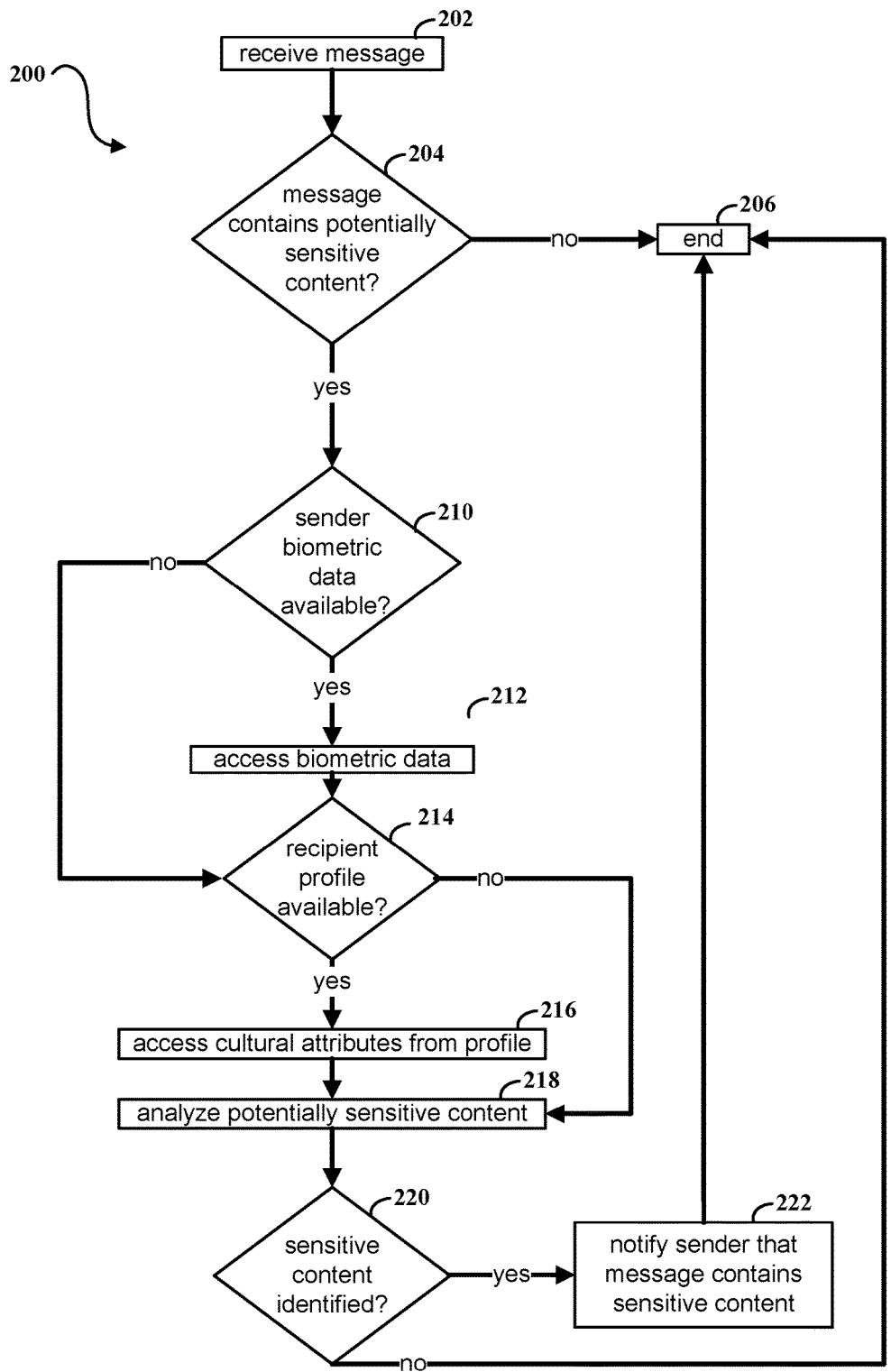
FIG. 2 depicts a flow diagram of a method for alerting a sender of sensitive content in a message, according to embodiments.

FIG. 2 depicts a flow diagram of a method 200 for alerting a sender of sensitive content in a message, according to embodiments. The method 200 may be executed over one or more computer processor circuits. The method 200 may begin when a system receives a message, per 202. In embodiments, this system may be a computer system or systems. The received message can be a text message, an email message, an audio message, an instant message, or another kind of message that specifies a sender and a recipient. The system may intercept the message prior to its delivery to the recipient. The system may then determine if the message contains potentially sensitive content, per 204. As described herein, sensitive content can include words, phrases, topics, images, or other content that may be sensitive to a particular party based on, for example, the party's individuality including geography, or other demographical or other information.

If no potentially sensitive content is identified within the message, the system may end its interaction with the message, per 206. In embodiments, the message can then be delivered to the recipient without further interaction or modification. At 204, potentially sensitive content may be detected and identified as such. In some embodiments this may include tagging the potentially sensitive content for natural language processing or adding metadata to identify the content as potentially sensitive.

Once potentially sensitive content has been identified within the message, the system can monitor for biometric data from the sender, per 210. If available, the system can access the biometric data for the sender, per 212. In embodiments, the biometric data may include pulse rate, changes in body temperature, detection of sweat, or another parameter that could be considered indicator of stress or an adverse reaction. In embodiments, the biometric data may be received by the system pre-analyzed, in order to filter imprecise or misleading biometric data from the system's analysis. For example, biometric data for a positive emotion (e.g., excitement), due to, for example, news of positive results on a project a user had been leading, may appear similar to a stress-based reaction, based on biometric data alone. Thus, another system, for example, the biometric data analysis system 122 of FIG. 1, could process the biometric data, using context and other data available from the user's messaging and messaging history, to screen out all but biometric data associated with adverse emotional reactions. If no biometric data is available at 210, the system can monitor for a recipient profile, per 214. The recipient profile may contain individualized data about the intended recipient of the message. If no profile is available, the system can then analyze the potentially sensitive content, per 218, using NLP and data that is available. For example, the system may have biometric data about one or more of the users. The system could also analyze the potentially sensitive content using the biometric data and a corpus of sensitive words or subjects. In this analysis, a threshold could be slightly higher than in determining the potentially sensitive content, in order to err on the side of identifying neutral content as sensitive, rather than missing more obvious sensitive content.

In embodiments, the recipient profile is available and be detected by the system, per 214. Profiles may exist for both the sender and the recipient. Each profile may contain information about the user (e.g., the sender or recipient, respectively), and may be associated with an account, a device, or another entity with which may be assigned to or otherwise associated with the user. The profile may contain, for example, data including the user's geographic location, job role or professional description, or other individualized data that may have been made available to the system. For example, a user may be invited to create a profile by providing individualized data to the system. In embodiments, this data may be encrypted, with personal identity information removed outside of the profile context, in order to maintain the user's privacy.

In embodiments, the system may then access data from the profile, per 216. For example, the system may access information including the user's current geographic location.

The system may then analyze the potentially sensitive content, per 218. In embodiments, the system may conduct the analysis based on the accessed biometric data from the sender as well as the accessed profile of the recipient. The system may also use a sensitive word database that may be specific to a particular user or group of users, or it may be updated based on historical use, or in another way. The system may also incorporate data mined from news sources or other web content on the Internet, in order to collect relevant historical or cultural events. This data can all be analyzed using natural language processing techniques to determine whether or not the potentially sensitive content may actually touch on a topic sensitive to the recipient, per 220. If no sensitive content is identified at 220, the system can end, per 206.

In response to the identification of sensitive content within the message at 220, the system may notify the sender that the message contains sensitive content, per 222. In cases, the sender may need to view or confirm a view of the notification before the message will be delivered to the recipient. Other cases may allow for a user or system administrator controlled setting or settings which dictate the extent to which the notification will interfere with the normal delivery of the message. In embodiments, this could be modified relative to the sender, the recipient, the medium on which the message is being sent, or another factor. Once the sender has been notified, the system may end.

Figure 3:
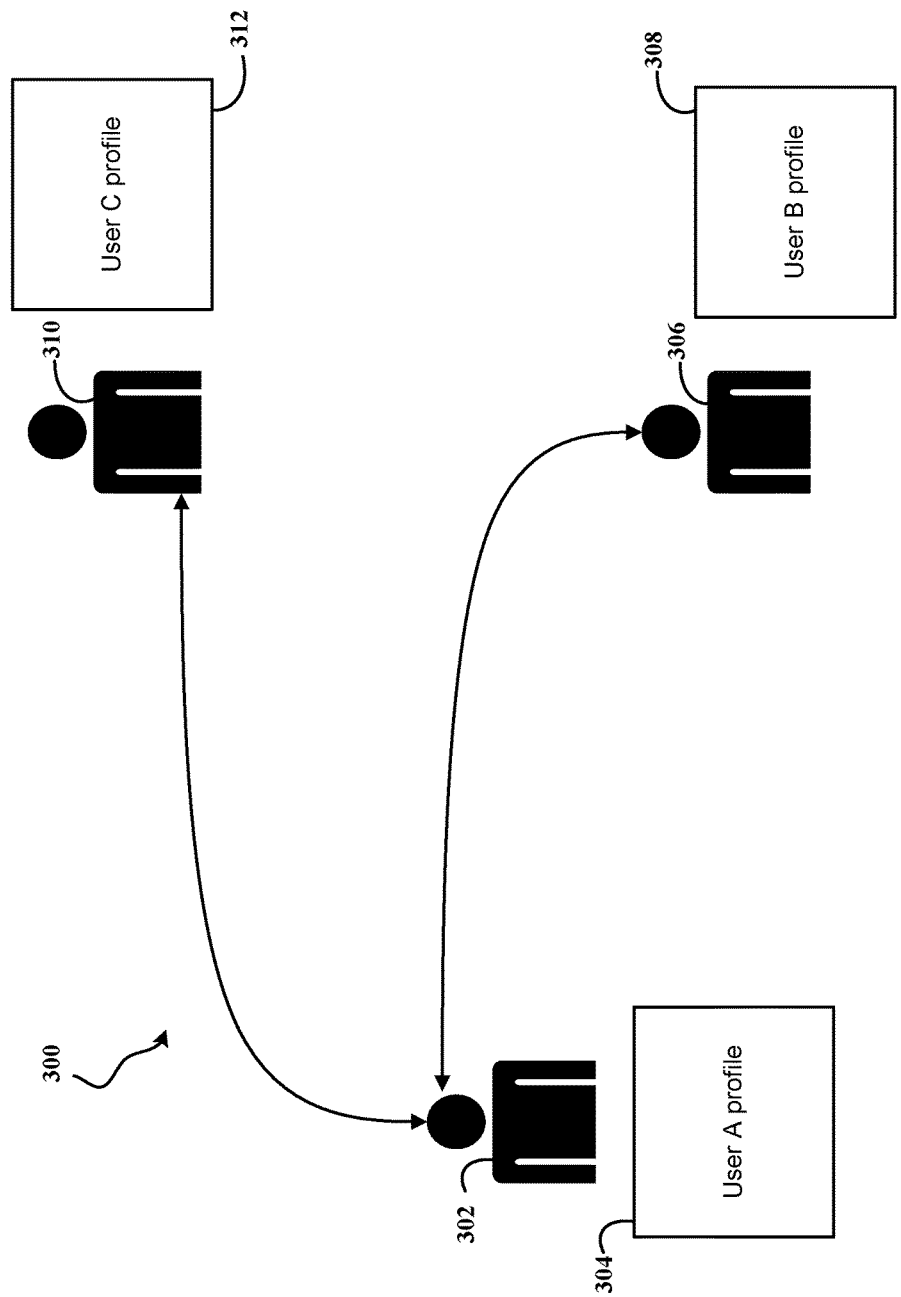
FIG. 3 depicts a block diagram of a system for user to user interaction, according to embodiments.

FIG. 3 depicts a block diagram of a system 300 for user to user interaction, according to embodiments. The system 300 may be analogous to the system 100 of FIG. 1, with the complexities of FIG. 1 not depicted in FIG. 3 still present. FIG. 3 depicts a diagram of user to user interaction that may utilize embodiments of the present disclosure, including for example system 100 of FIG. 1.

In embodiments, user A 302 may be chatting with user B 306 and user C 310 over internal company instant messaging. Each user, including users A 302, B 306, and C 310, may be associated with a user profile, including user A profile 304, user B profile 308, and user C profile 312, respectively. These profile may be the same or similar to profiles contained in data repository 120 of FIG. 1. For purposes of this description, user A 302 may be considered the sender and user B 306 and user C 310 may each be considered the recipients. Additionally, though user A 302 is referred to as the sender, user A 302 can also receive messages, and vice versa regarding users B 306 and C 310. The arrows between users A 302 and C 310, and A 302 and B 306, may reflect the direction of communication flow, not a direct transfer of that data, as data would pass through an SWS (for example SWS 124 of FIG. 1).

In embodiments, the sender, user 302 may send a message containing a potentially sensitive word to recipient user 310. A system, for example, the sensitive word system (SWS) 124 of FIG. 1, may, as described herein, detect content in the message that may be sensitive to the recipient user 310. As described in more detail, this determination may be based on biometric data received from the sender, user A 302, and cultural or other data accessed from the recipient's profile, for example, user C profile 312. In response to the system detecting sensitive content and notifying the sender user A 302, the system may receive confirmation from the sender user A 302 that the message is to be delivered despite the sensitive content notification. The message may then be delivered, unaltered, to the recipient user C 310. The system may then monitor for biometric data from the recipient that indicates a positive, neutral, or negative emotional response to the receipt of the message. For example, a negative emotional response may indicate or further confirm an indication of sensitive content within the message. NLP could be used (for example, by either the biometric data system or SWS), in order to factor in the content of the message in the analysis. For example, the message could not contain any culturally sensitive content, but it could contain bad news for the recipient that may elicit a negative emotional response. In this case, the use of NLP (for example, in the biometric data system), could correct for this emotional response, and send, to the SWS, an analysis of the biometric data as a neutral result. In some embodiments, the system may receive a notification from, for example, the recipient device, that the message has been delivered; in other embodiments the system may receive a notification that the message has been read.

In an embodiment, the system may receive biometric data from the recipient user 310 that indicates a neutral biometric response. For example, this indication may be a result of processing by a biometric data analysis system, for example biometric data analysis system 122 of FIG. 1. The indication could also be a result of processing within the SWS itself, or in another way as described herein. In response to the receipt of a neutral biometric response, the system may update the recipient user profile, e.g., user C profile 312, to reflect that the sensitive word or content thought to be sensitive was not actually sensitive to the recipient user C 310.

In embodiments, a profile may consist of various attributes that relate to the user's geographic location and other individualized data. In a user profile, for example, user C profile 312, the system could collect and weight these various attributes using a level of sensitivity coefficient. Thus, the various words or groups of words could each be given varying weight based on the particular user. For example, the SWS may update the user C profile 312 by adjusting a particular weighting or weightings of the one or more attributes that had initially been identified as sensitive content. A user profile, for example user profiles A 304, B 308, and C 312, for users A-C, respectively, may also contain historical use data, which may include content and frequency of communication between the user of interest and one or more other users.

In embodiments, the system may also monitor the recipient's response message to the original sender in order to determine whether or not the weighting of the sensitivity of the identified content needs to be adjusted in the recipient user C profile 312. For example a natural language processing system, for example natural language processing system 112 of FIG. 1, may analyze the content of the recipient user C 310's response to sender user A 302, and determine that the content is appropriate, positive, and contains no indication that the recipient user C 310 was offended by the received message. This data, along with the biometric data, may result in a large adjustment of the sensitivity weighting of the attribute within the recipient user C profile 312. This may be in order to adjust the profile to more accurately reflect what content may or may not be offensive to or misunderstood by the recipient user C 310. In embodiments, the system may also update a profile to add or increase the sensitivity of a word in a particular user's profile, based on, for example, a negative biometric reaction and/or message response, following the receipt of a message identified as containing no sensitive content. Thus, the profile could be updated to reflect that content sensitive to the particular user was, in fact, included in the message.

In embodiments, just after sending a message to recipient user C 310, sender, user A 302 may also send a message to recipient user B 306. The system may analyze this message, as described herein, determine no sensitive content is included in the message, and continue with the delivery. The system may then detect a message being sent from the recipient user B 306 to the sender user A 302. The system may analyze that message, similar to the analysis of the originally transmitted message, as described herein. In determining whether or not the message contains sensitive content, the system may factor in data from user A profile 304, as well as biometric data from each of users B 306 and A 302. In addition to the analysis described for the initial message, the system may also base the sensitive content determination on the context including the current conversation (e.g., the previous message).

In other embodiments, prior to the transmission of messages, the system may determine that the sender and the recipient have the same or similar cultural attribute information, as determined by a comparison of their profiles. For example, if a sender is from one city and a recipient is from a different city, the weighting coefficient for the place of origin may be increased as opposed to if both were in the same city. For another example, if the sender and the recipient are both from the same city, then the weighting coefficient of the place of origin may be lowered. Other geographic and nongeographic weighting coefficients may be used. Because of this, the profiles can be continually updated in order to more accurately predict sensitivities in messages.

Figure 4:
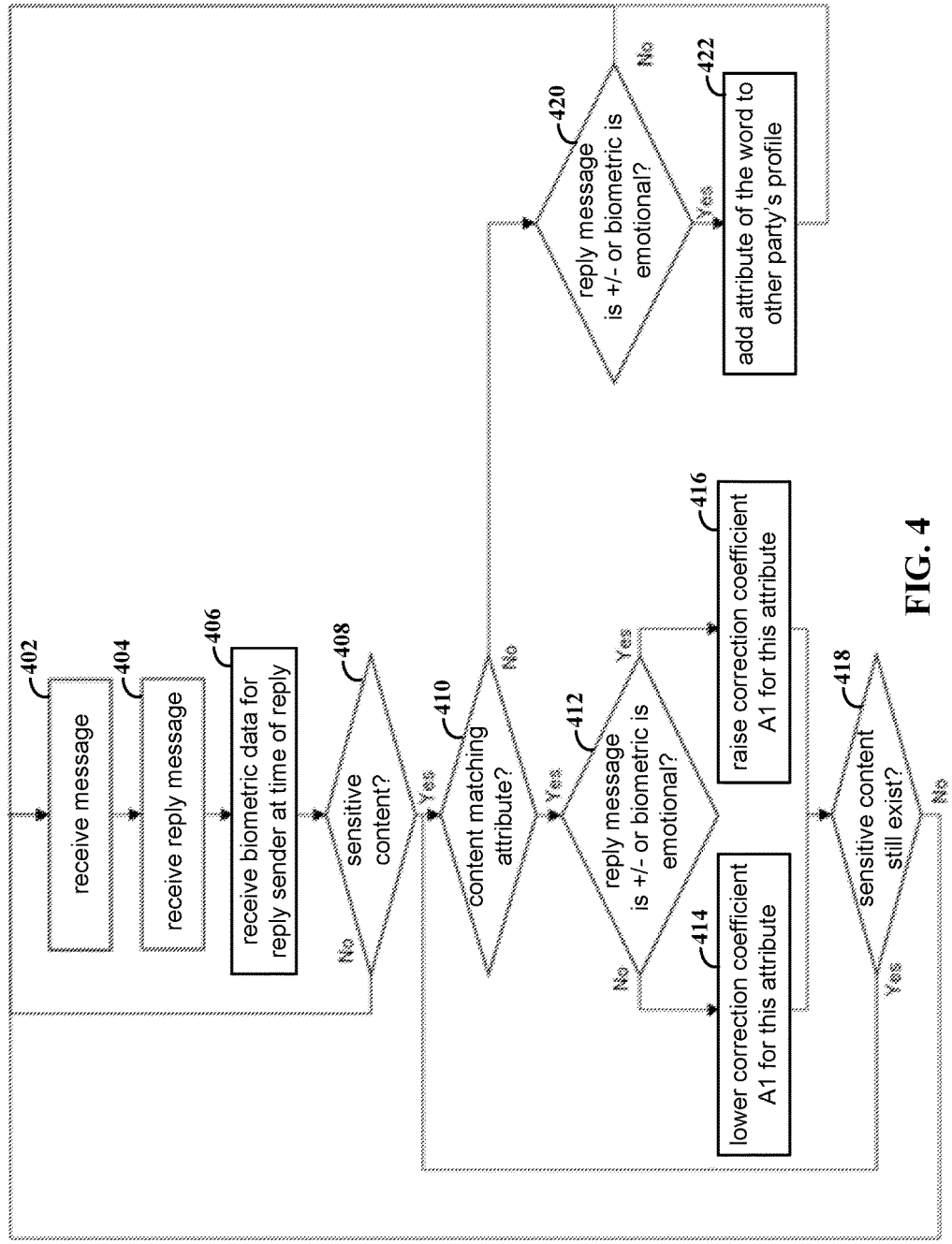
FIG. 4 depicts a flow diagram for updating a user profile based on feedback, according to embodiments.

FIG. 4 depicts a flow diagram for updating a user profile based on feedback, according to embodiments. A system, for example SWS 124 of FIG. 1, may receive a message, per 402, detect no sensitive content for the particular recipient, based on analysis of the recipient's current profile, and allow the message to be sent. A response to that message from the recipient to the sender may then be received by the system, per 404. The system may then receive biometric data, for example, biometric data that was collected from the sender of the reply message at the time of the reply, per 406. The system can then determine if there is sensitive content in the reply message, as described herein, per 408. If no sensitive content is identified in the reply message, at 408, the message can be delivered as specified by the sender, and the system can return to monitoring for a message. If sensitive content is detected in the message at 408, the system may determine whether or not the sensitive word matches an attribute in the recipient (other party's) profile. For example, if the message contains a location-specific sensitive word, for example, earthquake, where users in particular geographic regions might be sensitive to earthquakes based on a recent, devastating earthquake, the system may determine that the receiving user has a high sensitivity to this location-based cultural attribute. If, at 410, a matching attribute is detected in the receiving user's profile, the system may determine whether the reply message indicates an emotional response, per 412, as described herein by use of biometric data or natural language processing of the content of the message. If an emotional response is not detected, the system may lower a correction coefficient for the particular attribute, per 414. If an emotional response is detected, the system may raise the correction coefficient for the attribute. In embodiments, this could be the same as the weighted sensitivity of attributes in user profiles, for example, one or more user profiles stored in data repository 120 of FIG. 1.

The system may then determine if sensitive content still exists in the message, per 418. If it does, the system may loop back to 410, to determine if the sensitive content matches an attribute in the recipient's profile. If no sensitive content exists, at 418, the system may be finished handling that message, and may return to monitor for additional incoming messages.

If, at 410, the content does not match an attribute in the profile of the receiving user, the system may still determine whether or not there is an emotional response or reaction to the reply message, per 420. If the system determines that there is an emotional response, the system may add an attribute or attributes of the word to the other party's list of attributes (in the other party's (e.g., the receiving user's) profile), per 422. If no emotional response is detected from the reply message at 420, the system may return to monitoring for incoming messages, to begin again when a message is received, per 402.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving a message that specifies a sender and a recipient;
   identifying from within the message, potentially sensitive content;
   receiving, from a device, sender biometric data, the sender biometric data comprising biometric data collected about the sender;
   accessing, from a data repository, a recipient profile, the recipient profile comprising individualized data about the recipient and a sensitivity coefficient for each of the individualized data, wherein the sensitivity coefficient is a weight indicating the sensitivity of the individualized data to the recipient;
   analyzing, by a natural language processing system, the potentially sensitive content, the analyzing based on:
   the sender biometric data,
   the recipient profile, and
   a sensitive word database, wherein the sensitive word database is selected based on characteristics of the sender;
   identifying, based on the analyzing, sensitive content within the potentially sensitive content, the sensitive content being sensitive to the recipient;
   notifying the sender, in response to the identifying, that the message contains content sensitive to the recipient;
   receiving, from the sender and after the notifying, confirmation that the message is to be sent;
   receiving recipient biometric data, the recipient biometric data collected upon the recipient's receipt of the message;
   analyzing, based on the sensitive word database, the recipient profile, and the recipient biometric data, the sensitive content;
   determining, based on the analyzing, that the sensitive content is not sensitive to the recipient; and
   updating, in response to the determining, the recipient profile, wherein the updating comprises adjusting the sensitivity coefficient.

2. The method of claim 1, wherein the individualized data in the recipient profile is provided by the recipient prior to receiving the message.

3. The method of claim 1, wherein the recipient biometric data is collected by and received from a biometric data analysis system.

4. A system comprising:
   a computer readable storage medium with program instructions stored thereon; and
   one or more processors configured to execute the program instructions to perform a method comprising:
   receiving a message that specifies a sender and a recipient;
   identifying from within the message, potentially sensitive content;
   receiving, from a device, sender biometric data, the sender biometric data comprising biometric data collected about the sender;
   accessing, from a data repository, a recipient profile, the recipient profile comprising individualized data about the recipient and a sensitivity coefficient for each of the individualized data, wherein the sensitivity coefficient is a weight indicating the sensitivity of the individualized data to the recipient;
   analyzing, by a natural language processing system, the potentially sensitive content, the analyzing based on:
   the sender biometric data,
   the recipient profile, and
   a sensitive word database, wherein the sensitive word database is selected based on characteristics of the sender;
   identifying, based on the analyzing, sensitive content within the potentially sensitive content, the sensitive content being sensitive to the recipient;
   notifying the sender, in response to the identifying, that the message contains content sensitive to the recipient;
   receiving, from the sender and after the notifying, confirmation that the message is to be sent;
   receiving recipient biometric data, the recipient biometric data collected upon the recipient's receipt of the message;

analyzing, based on the sensitive word database, the recipient profile, and the recipient biometric data, the sensitive content;

determining, based on the analyzing, that the sensitive content is not sensitive to the recipient; and updating, in response to the determining, the recipient profile, wherein the updating comprises adjusting the sensitivity coefficient.

5. The system of claim 4, wherein the individualized data in the recipient profile is provided by the recipient prior to receiving the message.

6. The system of claim 4, wherein the recipient biometric data is collected by and received from a biometric data analysis system.

7. A computer program product comprising a compute readable storage medium having program instructions embodied therewith, wherein the computer readable storage medium is not a transitory signal per se, the program instructions executable by a computer processor to cause the processor to perform a method comprising:

receiving a message that specifies a sender and a recipient;

identifying from within the message, potentially sensitive content;

receiving, from a device, sender biometric data, the sender biometric data comprising biometric data collected about the sender;

accessing, from a data repository, a recipient profile, the recipient profile comprising individualized data about the recipient and a sensitivity coefficient for each of the individualized data, wherein the sensitivity coefficient is a weight indicating the sensitivity of the individualized data to the recipient;

analyzing, by a natural language processing system, the potentially sensitive content, the analyzing based on:
the sender biometric data,
the recipient profile, and
a sensitive word database, wherein the sensitive word database is selected based on characteristics of the sender;

identifying, based on the analyzing, sensitive content within the potentially sensitive content, the sensitive content being sensitive to the recipient;

notifying the sender, in response to the identifying, that the message contains content sensitive to the recipient;

receiving, from the sender and after the notifying, confirmation that the message is to be sent;

receiving recipient biometric data, the recipient biometric data collected upon the recipient's receipt of the message;

analyzing, based on the sensitive word database, the recipient profile, and the recipient biometric data, the sensitive content;

determining, based on the analyzing, that the sensitive content is not sensitive to the recipient; and updating, in response to the determining, the recipient profile, wherein the updating comprises adjusting the sensitivity coefficient.

8. The computer program product of claim 7, wherein the individualized data in the recipient profile is provided by the recipient prior to receiving the message.

9. The computer program product of claim 7, wherein the recipient biometric data is collected by and received from a biometric data analysis system.

* * * * *